United States Patent

Satoh et al.

[11] Patent Number: 5,362,096
[45] Date of Patent: Nov. 8, 1994

[54] MODULE COVER MOUNTING STRUCTURE FOR AN AIR BAG DEVICE FOR A PASSENGER

[75] Inventors: Takeshi Satoh; Takayasu Zushi, both of Shiga, Japan

[73] Assignee: Takata Corporation, Tokyo, Japan

[21] Appl. No.: 21,571

[22] Filed: Feb. 24, 1993

[30] Foreign Application Priority Data

Mar. 5, 1992 [JP] Japan ............... 4-048510
Mar. 17, 1992 [JP] Japan ............... 4-060116

[51] Int. Cl.⁵ .............................. B60R 21/16
[52] U.S. Cl. .................... 280/728 B; 280/732
[58] Field of Search ........... 280/728 R, 728 B, 730 R, 280/731, 732, 743

[56] References Cited

U.S. PATENT DOCUMENTS 4,964,653 10/1990 Parker ....................... 280/732
5,013,064 5/1991 Miller et al. .................. 280/730 R
5,060,971 10/1991 Nanbu et al. ................. 280/728 B

FOREIGN PATENT DOCUMENTS

2244682 12/1991 United Kingdom .
2250000 5/1992 United Kingdom .

Primary Examiner—Brian L. Johnson
Assistant Examiner—Victor E. Johnson
Attorney, Agent, or Firm—Kanesaka & Takeuchi

[57] ABSTRACT

A module cover mounting structure for an air bag device for a passenger, is formed of an opening formed in the instrument panel of an automobile for mounting the air bag device, a module cover for covering the opening such that its peripheral edge covers the edge of the opening inside of the cabin of the automobile, and a plurality of tear lines formed in the module cover and adapted to be torn by the push of said air bag, when the air bag is inflated. The central portion of the module cover is torn into a door shape to be opened into the cabin. The tear lines are composed of a lefthand tear line running along the side of said module cover at the lefthand side of the automobile and a righthand tear line running along the side at the righthand side of the automobile. The lefthand and righthand tear lines run up to the edge of the module cover at the back side of the automobile.

6 Claims, 9 Drawing Sheets

PRIOR ART

MODULE COVER MOUNTING STRUCTURE FOR AN AIR BAG DEVICE FOR A PASSENGER

FIELD OF THE INVENTION

The present invention relates to an air bag device which is mounted on a vehicle for protecting a passenger at the time of a collision of the vehicle. More particularly, the present invention relates to an improvement in a module cover structure for the air bag device.

DESCRIPTION OF THE RELATED ART

In an air bag device for a passenger, an air bag and an inflater are mounted in a container, and a module cover is attached to cover the opening of the container. This module cover may also be called the "cover door" or "deployment door". At the time of a vehicular collision, the inflater is energized to inflate the air bag, and the module cover is opened into the cabin by the push of the air bag inflated, so that the air bag is largely extended into the cabin.

The schematic construction and operations of a passenger's air bag device according to the prior art will be described with reference to FIGS. 7 to 9.

Figure 7:
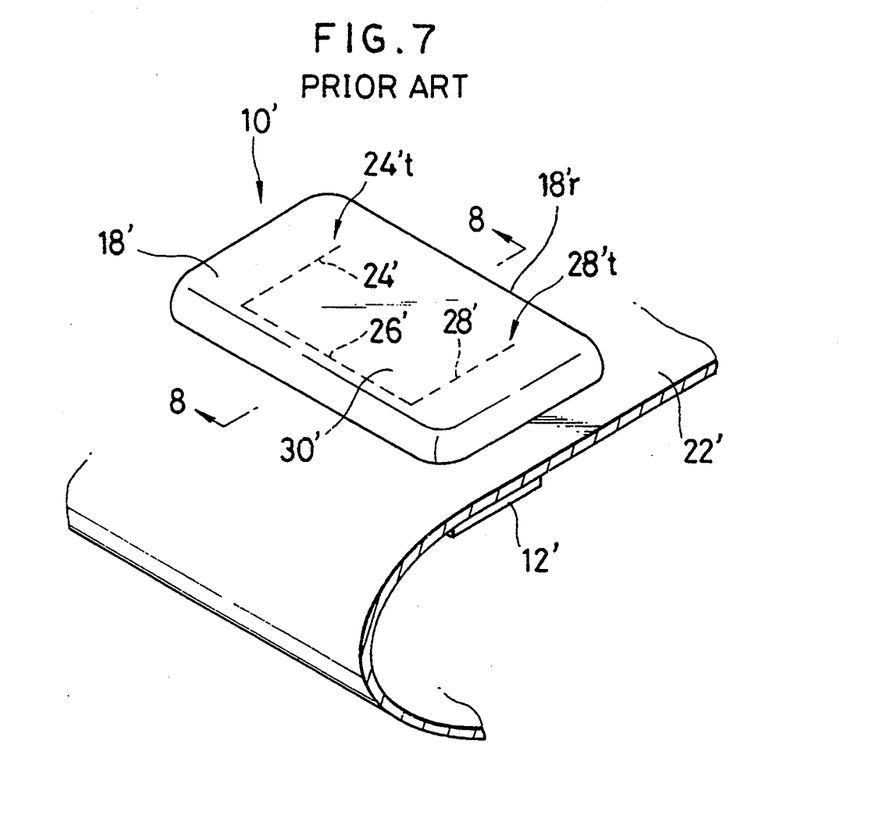
FIG. 7 is a perspective view showing the module cover mounting structure for the passenger's air bag device according to the prior art.

FIG. 7 is a schematic perspective view showing the passenger's air bag device of the prior art; FIG. 8 is a section taken along line 8—8 of FIG. 7; and FIG. 9 is a perspective view for explaining the operations. This passenger's air bag device 10' is mounted in a casing 12' with its air bag 14' being folded. In the casing 12', there is fitted an inflater 16' for extending the air bag 14'. The casing 12' has its front or upper side opened into the cabin of a vehicle. A module cover 18' is provided for covering that opening. This cover 18' is constructed to have a reinforcement plate 18'b of a metal mounted in the inside (or on the back side) of a body 18'a of a synthetic resin. Reference numeral 20' designates an opening which is formed in the instrument panel 22' of the vehicle for mounting the air bag device.

The module cover 18' is formed with three tear lines 24', 26! and 28'. The tear line 24' runs along the lefthand side of the vehicle whereas the tear line 28' runs along the righthand side of the vehicle. The tear line 26' runs to connect the one-side ends of the tear lines 24' and 28'.

If the vehicle carrying the air bag device 10' collides, the inflater 16' is energized to inflate the air bag 14' so that the air bag 14' pushes the module cover 18'. As a result, the module cover 18' is torn along the tear lines 24', 26' and 28' so that a door-shaped portion 30' defined by those tear lines 24', 26' and 28' is opened, as shown in FIG. 9. Thus, the air bag 14' is allowed to extend largely into the cabin.

In the air bag device 10' of the prior art, the module cover 18' is formed with the three tear lines 24', 26' and 28', which have to be torn when the air bag 14' is extended. It is liable to take a considerably long time for all the tear lines to be torn.

Figure 8:
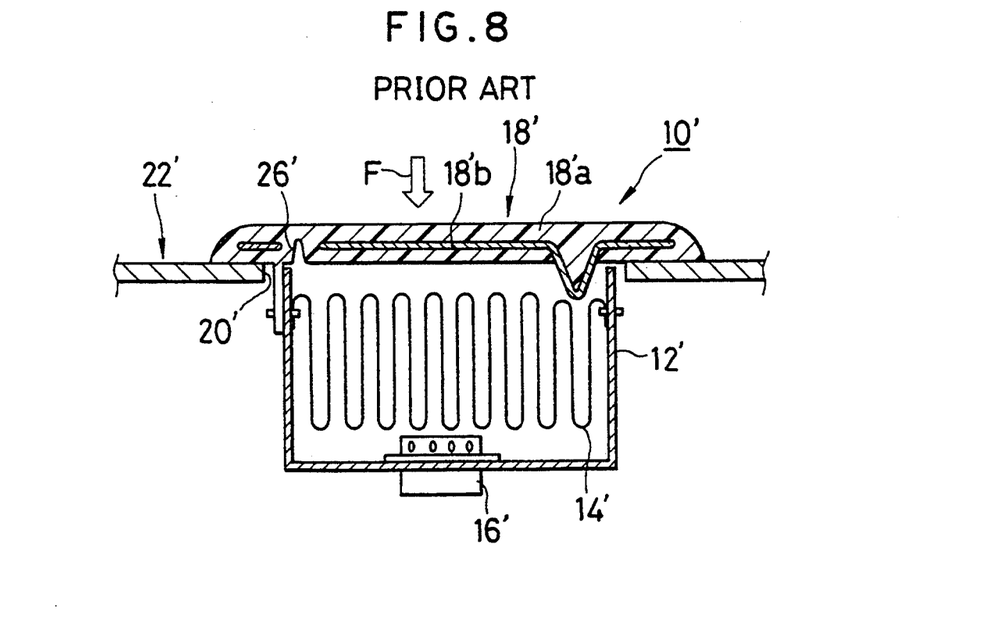
FIG. 8 is a section taken along line 8—8 of FIG. 7.
Figure 9:
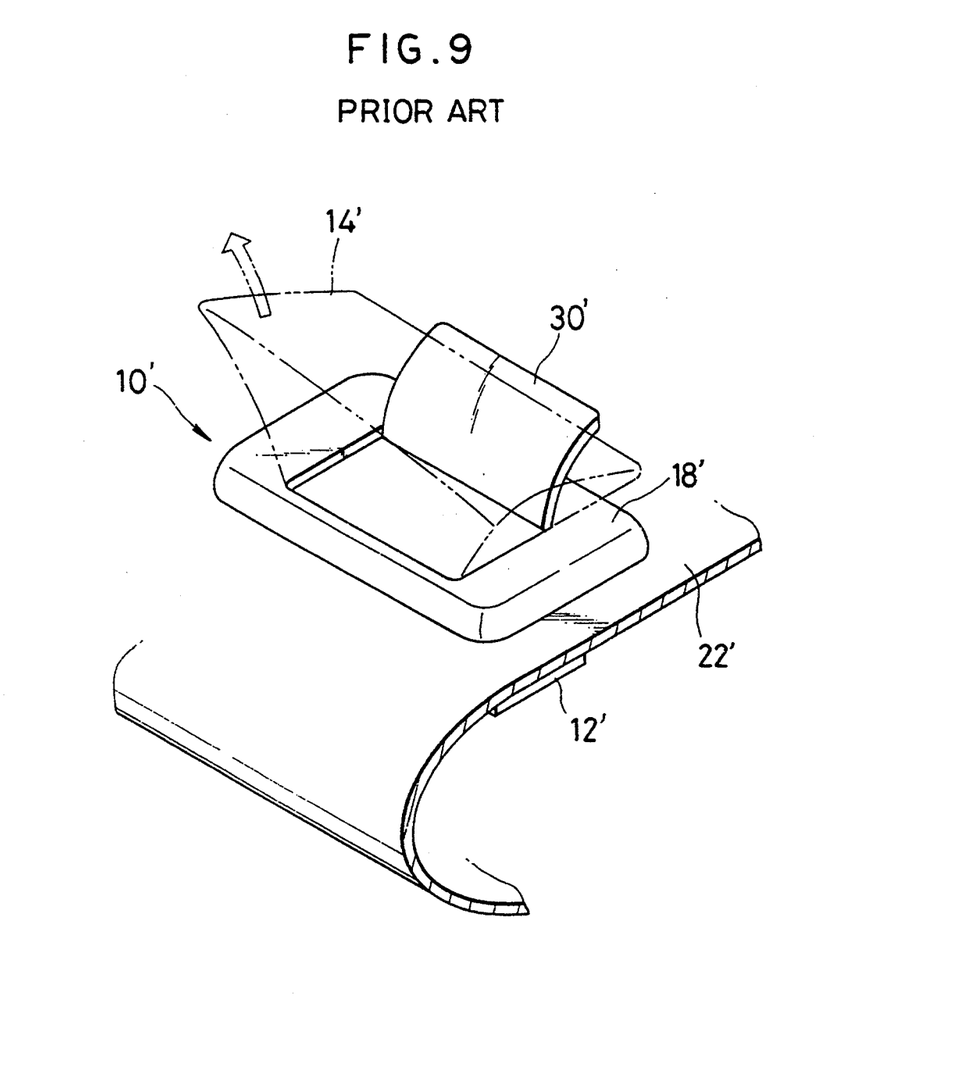
FIG. 9 is a perspective view for explaining the tears of the module cover of the prior art.

In the air bag device 10' of the prior art, if the module cover 18' is pushed from the inside of the cabin by a force F of FIG. 8, it is warped in the retracting direction. Then, strong shearing forces are applied to the portions of the tear lines 24', 26' and 28' so that the module cover 18' is liable to have its inside face wrinkled.

Figure 10:
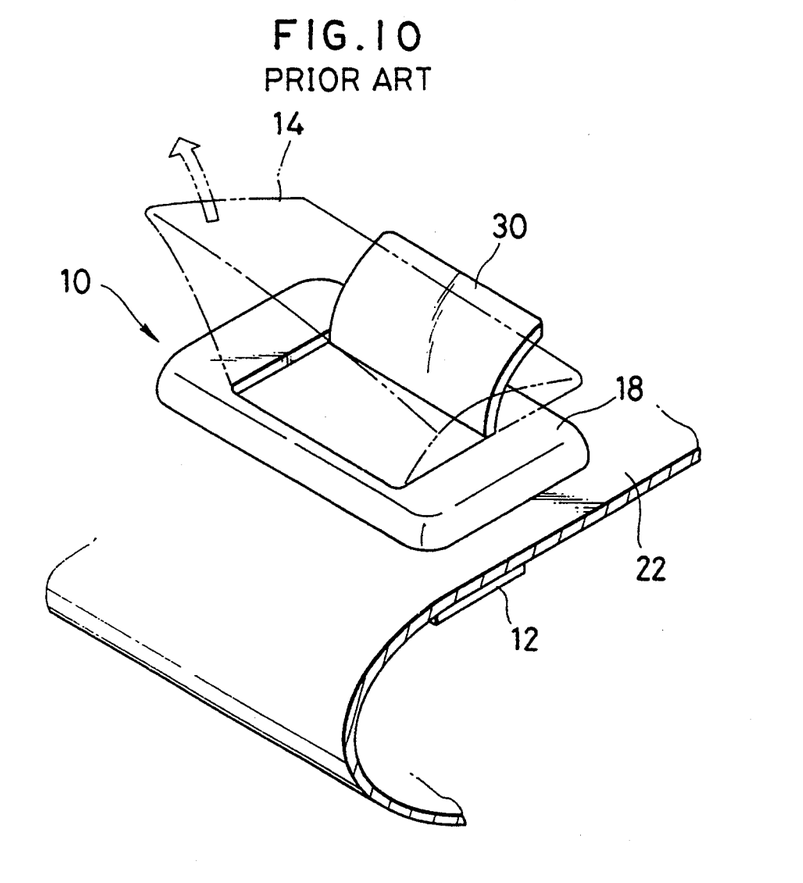
FIG. 10 is a perspective view for explaining the tears of the module cover of the prior art.

In the air bag device 10' of the prior art, also the tear lines 24' and 28' formed in the module cover 18' reach the front end portion 24't and 28't, not the front side 18'r of the module cover. Thus, there arises a problem that the door-shaped portion 30' is so large that the module cover 18' is reluctant to open, as shown in FIG. 10.

OBJECT AND SUMMARY OF THE INVENTION

According to a first aspect of the present invention, there is provided a module cover mounting structure for an air bag device for a passenger, comprising an opening formed in the instrument panel of an automobile for mounting the air bag device, a module cover for covering the opening such that its peripheral edge covers the edge of the opening inside of the cabin of the automobile, and a plurality of tear lines formed in the module cover and adapted to be torn by the push of the air bag, when the air bag is inflated. The central portion of the module cover is torn into a door shape to be opened into the cabin. The tear lines are composed of a lefthand tear line running along the side of the module cover at the lefthand side of the automobile and a righthand tear line running along the side at the righthand side of the automobile. The lefthand and righthand tear lines run up to the edge of the module cover at the back side of the automobile.

According to a second aspect, the module cover mounting structure for a passenger's air bag device further comprises a reinforcing member mounted in the door-shaped portion to cross over the opening. The reinforcing member operates to block the retraction of the door-shaped portion, when the module cover is pushed from the inside of the cabin, and to deform integrally with the door-shaped portion when the module cover is pushed by the air bag being inflated, to open the door-shaped portion into the cabin of the automobile.

In the module cover mounting structure for a passenger's air bag device according to the first and second aspects, if the module cover is pushed from the back by the air bag when the air bag is inflated, the tear lines are torn so that the door-shaped portion begins to open like a door. Then, the air bag is extended into the cabin.

The module cover is formed with only two tear lines having a shorter total length than that of the tear lines of the prior art. As a result, the time period required for tearing the tear lines is so short that the air bag can be quickly extended into the cabin.

In the module cover mounting structure for a passenger's air bag device according to the second aspect, the reinforcing member fitted in the door-shaped portion of the module cover crosses over the opening of the instrument panel. As a result, even if the module cover is subjected to the pushing force from the inside of the cabin, it is hardly retracted or deformed so that no shearing force is applied to the tear lines.

According to a third aspect of the present invention, there is provided a module cover for an air bag device for a passenger comprising a plurality of tear lines adapted to be torn by the push of an air bag, when the air bag is inflated, to open the central portion of the module cover in a door shape into the cabin of the automobile. The tear lines are composed of a lefthand tear line running along the side of the module cover at the lefthand side of the automobile and a righthand tear line running along the side at the righthand side of the automobile. The lefthand and righthand tear lines run up to the side of the module cover at the front side of the automobile.

In the module cover for a passenger's air bag device according to the third aspect, the door-shaped portion largely opens remarkably easily because the tear lines reach the side of the module cover at the front side of the automobile.

DESCRIPTION OF THE PREFERRED EMBODIMENTS

Embodiments according to first and second aspects will be described in the following with reference to FIGS. 1 to 6.

Figure 1:
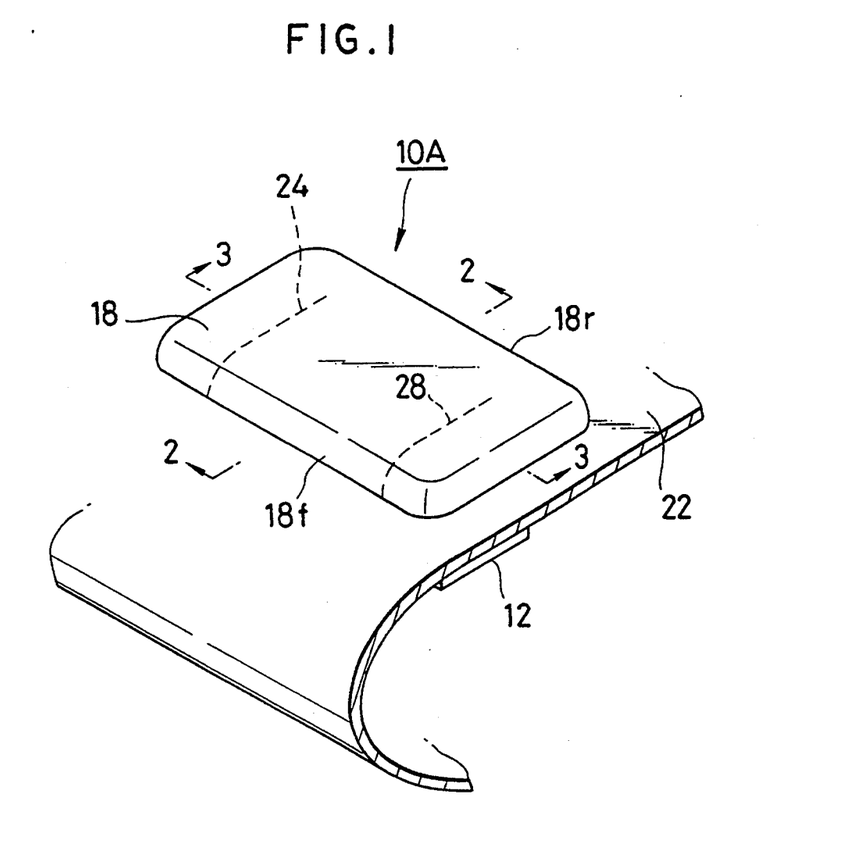
FIG. 1 is a perspective view showing a module cover mounting structure for a passenger's air bag device according to one embodiment of the present invention.
Figure 2:
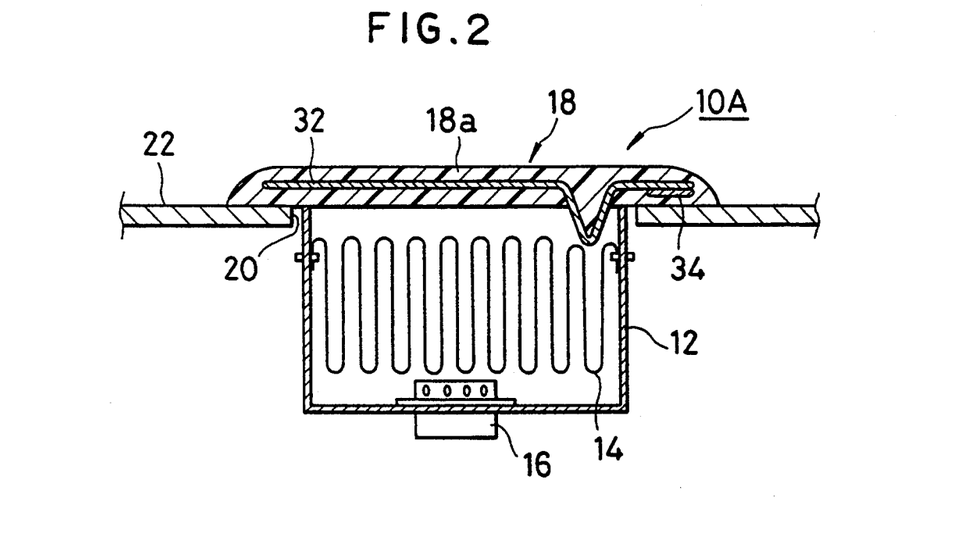
FIG. 2 is a section taken along line 2—2 of FIG. 1.

In the present embodiment, a module cover 18 is formed with only two tear lines 24 and 28. The tear lines 24 and 28 reach the front edge 18f of the module cover 18 at their leading ends and are isolated at their rear ends from the rear edge 18r of the module cover 18.

Into a door-shaped portion 30 between the tear lines 24 and 28, there is inserted a metal plate or a second panel 32 of aluminum or the like acting as a reinforcing member. The plate 32 crosses over the front and rear edges of an opening 20 of an instrument panel 22.

Figure 3:
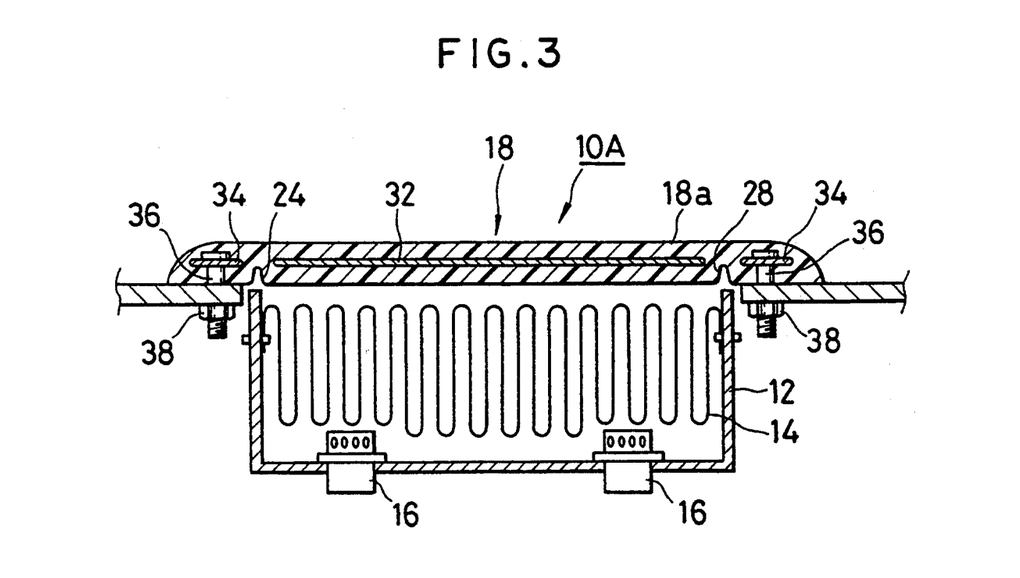
FIG. 3 is a section taken along line 3—3 of FIG. 1.
Figure 5:
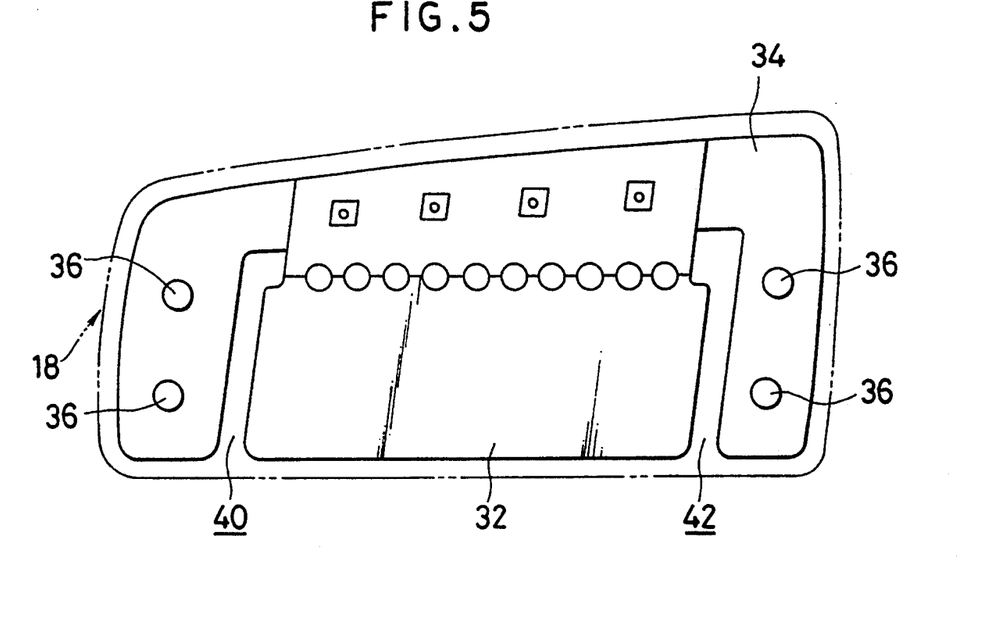
FIG. 5 is a top plan view showing a reinforcing member in the module cover.
Figure 6:
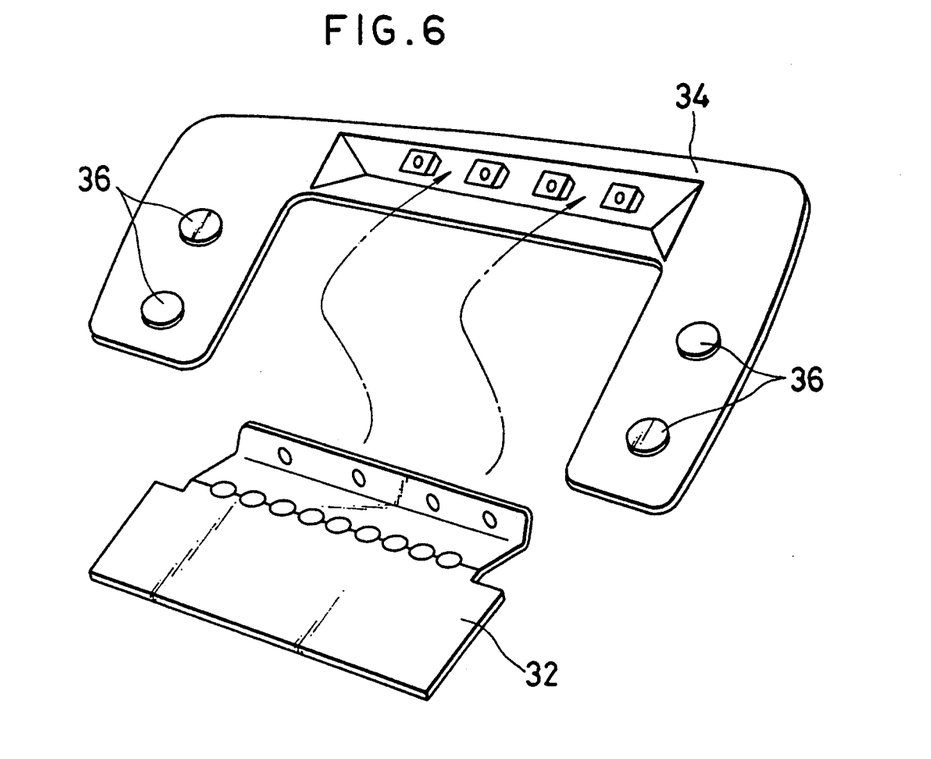
FIG. 6 is an exploded perspective view showing the reinforcing member in the module cover.

FIGS. 5 and 6 are explanatory views showing the shape of a metal plate of aluminum or the like inserted into the module cover 18. The plate 32 is attached to a generally U-shaped plate 34 or a first panel with a notch. In the plate 34, there are embedded bolts 36. The bolts 36 are extended through the instrument panel 22, as shown in FIG. 3, and the module cover 18 is fixed on the instrument panel 22 by fastening nuts 38 on the bolts 36. Incidentally, the tear lines 24 and 28 are naturally arranged along gaps 40 and 42 between the plate 32 and the plate 34.

The remaining construction of the present embodiment is similar to that of the aforementioned example of the prior art, and the reference numerals having no dash designate the corresponding portions.

Figure 4:
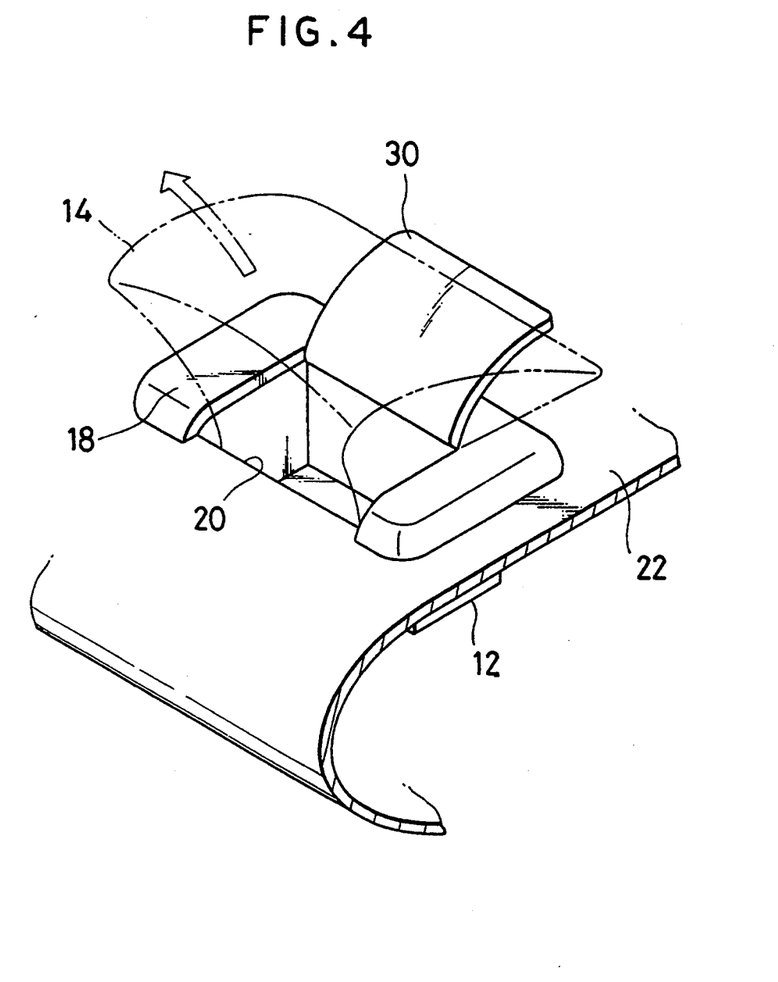
FIG. 4 is a perspective view for explaining the tears of a module cover according to the embodiment.

In the module cover mounting structure for a passenger's air bag device thus constructed, the tear lines 24 and 28 are torn to open the door-shaped portion 30 like a door if an air bag 14 pushes the module cover 18 from the back when the air bag 14 is inflated. Then, the air bag 14 extends into the cabin. The module cover 18 is formed with only two tear lines 24 and 28 so that the tear lines 24 and 28 have a total length shorter than that of the prior art (of FIG. 7) substantially by the length of the tear line 26'. As a result, the time period required for tearing the tear lines is reduced so that the air bag 14 is quickly extended into the cabin.

Moreover, the metal plate 32 fitted in the door-shaped portion 30 of the module cover crosses over the opening 20 of the instrument panel 22. As a result, even if the pushing force is applied to the module cover 18 from the inside of the cabin of the automobile, the module cover is hardly retracted or deformed so that no shearing force is applied to the tear lines 24 and 28.

In the present embodiment, the leading ends of the tear lines 24 and 28 reach the front edge 18f of the module cover 18 but may terminate just near the front edge 18f.

As has been described hereinbefore, the module cover mounting structure for a passenger's air bag device according to the first and second aspects has a short total length of the tear lines, and the door-shaped portion can quickly open so that the air bag can be quickly extended into the cabin of the automobile.

According to the module cover mounting structure for a passenger's air bag device of the second aspect, the module cover is prevented from retracting or deforming so that the shearing stress to be applied to the tear lines can be reduced. As a result, the durability of the module cover is remarkably improved.

Figure 11:
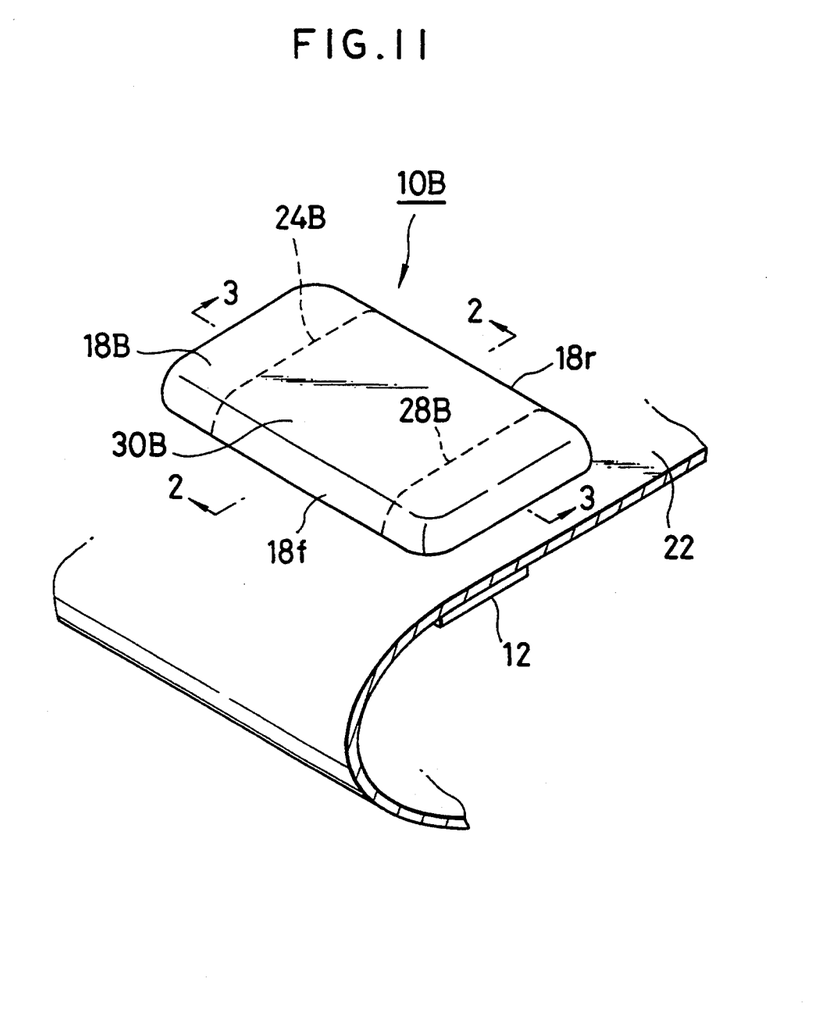
FIG. 11 is a perspective view showing another embodiment.
Figure 12:
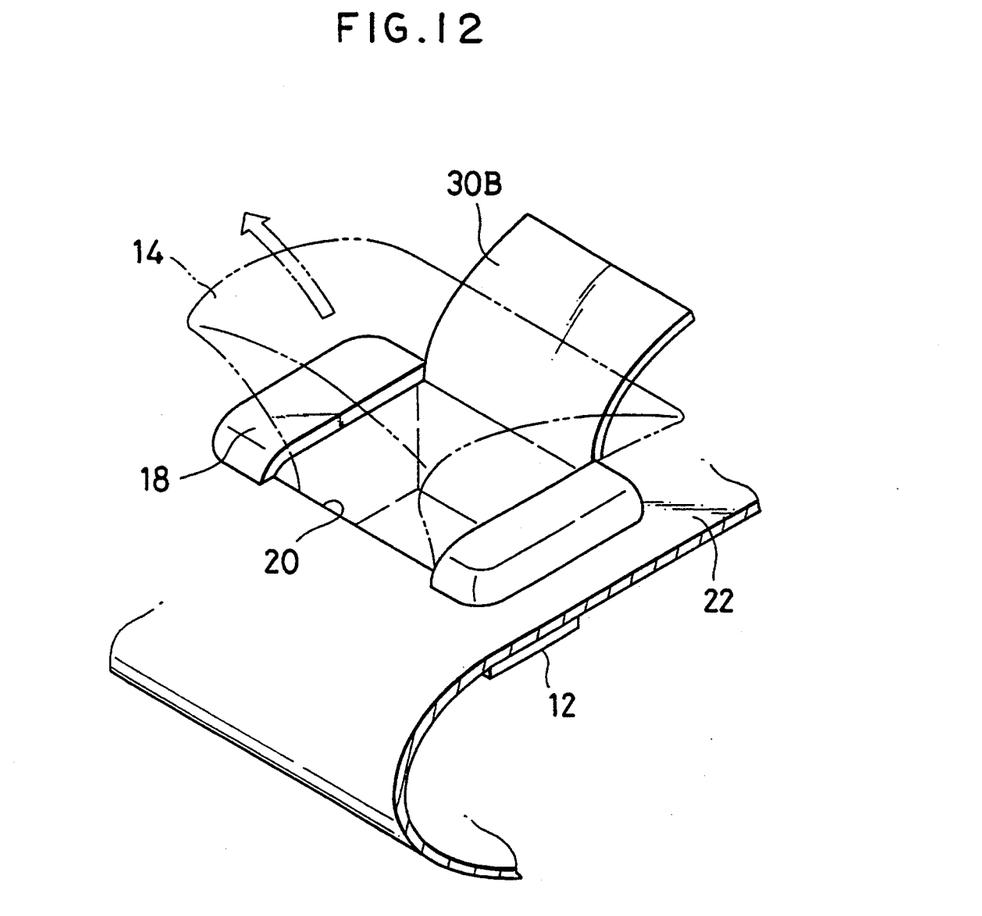
FIG. 12 is a perspective view for explaining the tears of the module cover according to the embodiment of FIG. 11.

An embodiment according to a third aspect will be described in the following with reference to FIGS. 11 and 12. FIG. 11 is a perspective view showing a passenger's air bag device 10B equipped with a module cover according to the embodiment, and FIG. 12 is a perspective view for explaining the tears of the module cover. Incidentally, the sections taken along lines 2—2 and 3—3 of FIG. 11 are absolutely identical to those of FIGS. 2 and 3. In the present embodiment, a module cover 18B is formed with only two tear lines 24B and 28B. The leading ends of the tear lines 24B and 28B reach the front edge 18f of the module cover 18B, and the rear ends reach the rear edge (i.e., the side at the front of the automobile) 18r of the module cover 18B. However, the tear lines 24B and 28B may terminate just near the rear edge 18r.

Into the door-shaped portion 30B between the tear lines 24B and 28B, there is inserted the metal plate 32 (although not shown) of aluminum or the like acting as the reinforcing member. This plate 32 crosses over the front and rear edges of the opening 20 of the instrument panel 22.

The remaining construction of the present embodiment is similar to that of the foregoing embodiment, and the identical reference numerals designate the identical portions.

In the module cover mounting structure for a passenger's air bag device thus constructed, the tear lines 24B and 28B are torn so that the door-shaped portion 30B begins to open like a door, if the air bag 14 pushes the module cover 18B from the back when the air bag 14 is inflated. Then, the air bag 14 is extended into the cabin of the automobile. Since the end portions of the tear lines 24B and 28B at the front side of the automobile reach the side 18r of the module cover 18B at the front side of the automobile, the door-shaped portion 30B is opened as bent backward, as shown in FIG. 12.

Incidentally, the metal plate 32 may be made of a hard synthetic resin or may be omitted if a suitable material for the module cover 18 is selected.

As has been described hereinbefore, since the tear lines of the module cover of the passenger's air bag device according to the third aspect reach up to the side of the module cover at the front side of the automobile, the module cover can be largely opened easily. Moreover, the air bag can be quickly extended into the cabin of the automobile by increasing the open area of the module cover.

What is claimed is:

1. A module cover mounting structure for an air bag device for a passenger, comprising:
   an instrument panel of an automobile for mounting the air bag device, said instrument panel having an opening therein defined by upper and lower edges and two side edges, and an outer surface facing a cabin of the automobile,
   a module cover extending beyond and completely covering said opening at the outer surface of the instrument panel, said module cover having two peripheral edges situated near the upper and lower edges,
   tear lines formed in said module cover, said tear lines consisting of first and second tear lines extending along and near the side edges of the opening of the instrument panel from one of the peripheral edges of the module cover to at least a portion near the other of the peripheral edges, and
   a reinforcing member attached to the module cover to extend beyond the upper, lower and two side edges of the opening, said reinforcing member having gaps corresponding to the tear lines forming a door-shaped portion extending beyond said lower side of said opening so that when the module cover is pushed toward the cabin of the automobile, the module cover is torn along the tear lines while force applied to the module cover from the cabin is substantially supported by the reinforcing member attached to the instrument panel.

2. A module cover mounting structure according to claim 1, wherein said first and second tear lines extend until said other peripheral edge.

3. A module cover mounting structure for an air bag device for a passenger, comprising:
   an instrument panel of an automobile for mounting the air bag device, said instrument panel having an opening therein defined by upper and lower edges and two side edges, and an outer surface facing a cabin of the automobile,
   a module cover extending beyond and completely covering said opening at the outer surface of the instrument panel, said module cover having two peripheral edges situated near the upper and lower edges,
   tear lines formed in said module cover, said tear lines consisting of first and second tear lines extending along and near the side edges of the opening of the instrument panel from one of the peripheral edges of the module cover to at least a portion near the other of the peripheral edges, and
   a reinforcing member attached to the module cover to substantially completely extend beyond the edges of the opening except for portions corresponding to the tear lines, said reinforcing member including a first panel having a notch extending from a side of the first panel, said notch having a size smaller than that of the opening of the instrument panel, a second panel attached to the first panel and located in the notch, and gaps formed at the portions corresponding to the tear lines and between the first and second panels, said gaps extending from said one peripheral edge to said portion near the other peripheral edge so that when the module cover is pushed toward the cabin of the automobile, the module cover is torn along the tear lines while force applied to the module cover from the cabin is substantially supported by the reinforcing member attached to the instrument panel.

4. A module cover mounting structure according to claim 3, wherein said first panel includes a plurality of bolts for attaching the module cover to the instrument panel.

5. A module cover mounting structure according to claim 3, further comprising a casing for retaining an air bag therein and having a front opening, said front opening being located in the opening of the instrument panel.

6. A module cover mounting structure according to claim 5, wherein said front opening of the casing has side edges for defining the front opening, said first and second tear lines being located above the side edges of the front opening.

* * * * *